United States Patent
Choi et al.

(10) Patent No.: US 11,364,773 B2
(45) Date of Patent: Jun. 21, 2022

(54) PLATE-TYPE HEAT EXCHANGER AND AIR CONDITIONING SYSTEM FOR VEHICLE HAVING THE SAME

(71) Applicant: HS R & A Co., Ltd., Gyeongsangnam-do (KR)

(72) Inventors: Jae Hyeok Choi, Gyeongsangnam-do (KR); Deok Hyun Lim, Gyeongsangnam-do (KR); Young Jun Kim, Gyeongsangnam-do (KR); Kwon Sik Hwang, Gyeongsangnam-do (KR)

(73) Assignee: HS R & A CO., LTD., Gyeongsangnam-Do (KR)

( * ) Notice: Subject to any disclaimer, the term of this patent is extended or adjusted under 35 U.S.C. 154(b) by 69 days.

(21) Appl. No.: 17/065,723

(22) Filed: Oct. 8, 2020

(65) Prior Publication Data

US 2021/0107336 A1  Apr. 15, 2021

(30) Foreign Application Priority Data

Oct. 14, 2019 (KR) .......................... 10-2019-0126589

(51) Int. Cl.
*B60H 1/32* (2006.01)
*F28D 9/00* (2006.01)
*F28F 3/04* (2006.01)

(52) U.S. Cl.
CPC ........... *B60H 1/3227* (2013.01); *F28D 9/005* (2013.01); *F28F 3/042* (2013.01); *B60H 2001/3291* (2013.01)

(58) Field of Classification Search
CPC .......... B60H 1/3227; B60H 2001/3291; F28D 1/0308; F28D 9/0012; F28D 9/0031;
(Continued)

(56) References Cited

U.S. PATENT DOCUMENTS 8,678,076 B2 * 3/2014 Shore .................... F28D 1/0333
165/153
10,151,541 B2   12/2018 Kim et al.
(Continued)

FOREIGN PATENT DOCUMENTS

JP   63-159675 U   10/1988
JP   2016-109423 A   6/2016
(Continued)

OTHER PUBLICATIONS

Office Action (12 pages), dated Oct. 5, 2021, from corresponding Japanese Application 2020-171786, with English translation.
(Continued)

*Primary Examiner* — Marc E Norman
(74) *Attorney, Agent, or Firm* — Crowell & Moring LLP; John C. Freeman

(57) ABSTRACT

A plate-type heat exchanger including a body plate, an upper plate, and a lower plate. The body plate includes a plurality of alternately stacked plates, a space between the plurality of plates having a first heat exchange passage through which a first refrigerant of high temperature and high pressure flows, and a second heat exchange passage through which a second refrigerant of low temperature and low pressure flows. A heat exchange between the first refrigerant and the second refrigerant is performed in the body plate. The upper plate is bonded to a front side of the body plate and having a first inlet hole through which the first refrigerant is introduced and a first outlet hole through which the second refrigerant is discharged. The lower plate is bonded to a rear side of the body plate and having a second inlet hole through which the second refrigerant is introduced and a second outlet hole through which the first refrigerant is discharged.

14 Claims, 10 Drawing Sheets

(58) Field of Classification Search
CPC ...... F28D 9/0037; F28D 9/005; F28D 9/0062; F28F 3/042; F28F 2275/04
USPC .................................................. 165/166, 167
See application file for complete search history.

(56) References Cited

U.S. PATENT DOCUMENTS

| | | |
|---|---|---|
| 10,852,068 B2 | 12/2020 | Kim et al. |
| 2008/0202735 A1* | 8/2008 | Geskes ................. F28D 9/0043 165/166 |
| 2016/0161192 A1 | 6/2016 | Kim et al. |
| 2019/0078843 A1 | 3/2019 | Kim et al. |
| 2019/0226731 A1 | 7/2019 | Mizuno et al. |
| 2019/0277578 A1* | 9/2019 | Bardeleben ............... F28F 3/04 |

FOREIGN PATENT DOCUMENTS

| | | |
|---|---|---|
| KR | 10-2001-0015811 A | 2/2001 |
| KR | 10-2016-0069783 A | 6/2016 |
| KR | 10-2017-0036867 A | 4/2017 |
| WO | WO 2017/212743 A1 | 12/2017 |

OTHER PUBLICATIONS

Office Action dated Oct. 15, 2020 from related Korean Patent Application No. 10-2019-0126589 (12 pages including English translation).

* cited by examiner

PLATE-TYPE HEAT EXCHANGER AND AIR CONDITIONING SYSTEM FOR VEHICLE HAVING THE SAME

CROSS-REFERENCE TO RELATED APPLICATION(S)

This application is based on and claims priority under 35 U.S.C. 119 to Korean Patent Application No. 10-2019-0126589, filed on Oct. 14, 2019, in the Korean Intellectual Property Office, the entire disclosure of which is herein incorporated by reference in its entirety.

BACKGROUND OF THE INVENTION

Field of the Invention

The disclosure relates to an air conditioning system for a vehicle and, more particularly, to a vehicle air conditioning system including a plate-type heat exchanger performing a heat exchange between different refrigerants.

Description of Related Art

In general, a vehicle air conditioning system provides a comfortable indoor environment by maintaining a suitable temperature inside a vehicle regardless of external temperature changes.

FIG. 1 is a schematic view illustrating a conventional air conditioning system for a vehicle, and FIG. 2 is a schematic view illustrating a vehicle air conditioning system including a conventional double tube heat exchanger.

A vehicle is generally equipped with air conditioning and heating systems for adjusting the temperature inside the vehicle. In these systems, as shown in FIG. 1, the air conditioning system 10 includes a compressor 1 for compressing a refrigerant of a gaseous state, a condenser 2 for condensing the compressed refrigerant into a liquid state by exchanging heat with the surroundings, an expansion valve 3 for depressurizing the condensed refrigerant, and an evaporator 4 for evaporating the expanded refrigerant into a gaseous state by exchanging heat with the surroundings.

In particular, as shown in FIGS. 1 and 2, the air conditioning system 10 further includes an internal heat exchanger 5 of a double tube structure installed in a refrigerant pipe P, through which a high-temperature, high-pressure liquid refrigerant is supercooled while exchanging heat with a low-temperature, low-pressure gaseous refrigerant.

However, the double tube internal heat exchanger 5 has a problem that it is difficult to accomplish sufficient heat exchange performance when the length is short, and it is not easy to construct a layout inside an engine room when the length is long.

In addition, when the double pipe (not shown) installed inside the refrigerant pipe P is formed in a curved shape, a bending processing is difficult, and there are limitations in a design such as a bending angle and a radius of curvature.

SUMMARY OF THE INVENTION

Various embodiments of the disclosure are to provide a plate-type heat exchanger, together with a vehicle air conditioning system including the plate-type heat exchanger, which performs a heat exchange between a refrigerant flowing from a condenser to an expansion valve and a refrigerant discharged from an evaporator. The plate-type heat exchanger not only accomplishes sufficient heat exchange performance, but also allows a flexible layout inside an engine room.

According to various embodiments, a plate-type heat exchanger may include a body plate including a plurality of alternately stacked plates, a space between the plurality of plates having a first heat exchange passage through which a first refrigerant of high temperature and high pressure flows, and a second heat exchange passage through which a second refrigerant of low temperature and low pressure flows, wherein a heat exchange between the first refrigerant and the second refrigerant is performed in the body plate; an upper plate bonded to a front side of the body plate and having a first inlet hole through which the first refrigerant is introduced and a first outlet hole through which the second refrigerant is discharged; and a lower plate bonded to a rear side of the body plate and having a second inlet hole through which the second refrigerant is introduced and a second outlet hole through which the first refrigerant is discharged. The body plate may include a plurality of high-temperature high-pressure plates each including a first plate of a plate shape, a first edge wall protruding in a front direction along an edge of the first plate while being inclined outward at a certain angle, and a plurality of first support protrusions protruding from a front surface of the first plate, wherein the first heat exchange passage is formed by the plurality of high-temperature high-pressure plates; and a plurality of low-temperature low-pressure plates alternately stacked with the plurality of high-temperature high-pressure plates, each of the plurality of low-temperature low-pressure plates including a second plate of a plate shape, a second edge wall protruding in a front direction along an edge of the second plate while being inclined outward at a certain angle, and a plurality of second support protrusions protruding from a front surface of the second plate, wherein the second heat exchange passage is formed by the plurality of low-temperature low-pressure plates, and wherein the second edge wall is greater in height than the first edge wall.

According to various embodiments, a vehicle air conditioning system may include a compressor compressing a refrigerant; a condenser condensing the refrigerant supplied from the compressor; an expansion valve expanding the refrigerant by adjusting a flow rate of the refrigerant supplied from the condenser; an evaporator evaporating the refrigerant supplied from the expansion valve by exchanging heat with a blown air to cool the air; and a plate-type heat exchanger performing a heat exchange between a first refrigerant of high temperature and high pressure flowing into the expansion valve from the condenser and a second refrigerant of low temperature and low pressure discharged from the evaporator, the plate-type heat exchanger being bonded to and formed integrally with the expansion valve.

According to the disclosure, because a heat exchanger for exchanging heat between the first refrigerant flowing from the condenser to the expansion valve and the second refrigerant discharged from the evaporator is constructed as the plate-type heat exchanger, sufficient heat exchange performance can be accomplished and the layout of the engine room is easy.

In addition, according to the disclosure, the size and volume of the plate-type heat exchanger can be reduced as much as possible by forming different heights of the low-temperature low-pressure plate through which the low-temperature low-pressure gaseous refrigerant flows and the high-temperature high-pressure plate through which the high-temperature high-pressure liquid refrigerant flows.

In addition, according to the disclosure, by forming the first support protrusions and the second support protrusions on the high-temperature high-pressure plate and the low-temperature low-pressure plate, deformation of each plate may be prevented during the brazing bonding process.

BRIEF DESCRIPTION OF THE DRAWINGS

The above and other aspects, features and advantages of certain embodiments of the disclosure will be more apparent from the following detailed description, taken in conjunction with the accompanying drawings.

DETAILED DESCRIPTION

Figure 1:
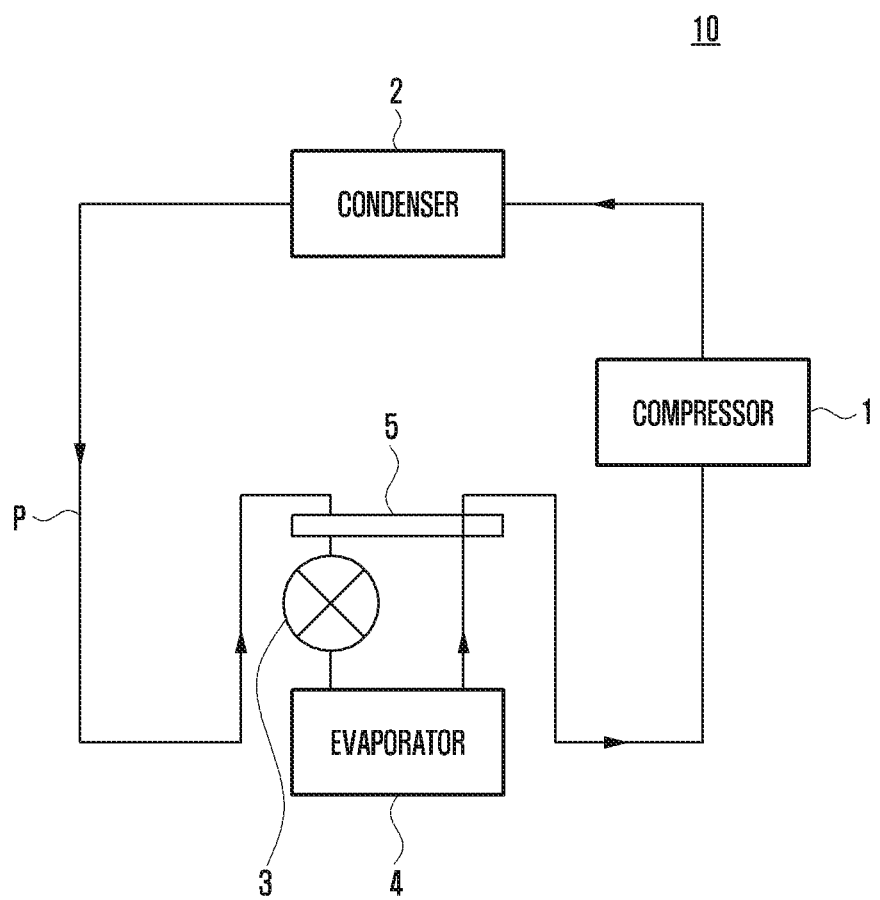
FIG. 1 is a schematic view illustrating a conventional air conditioning system for a vehicle.
Figure 2:
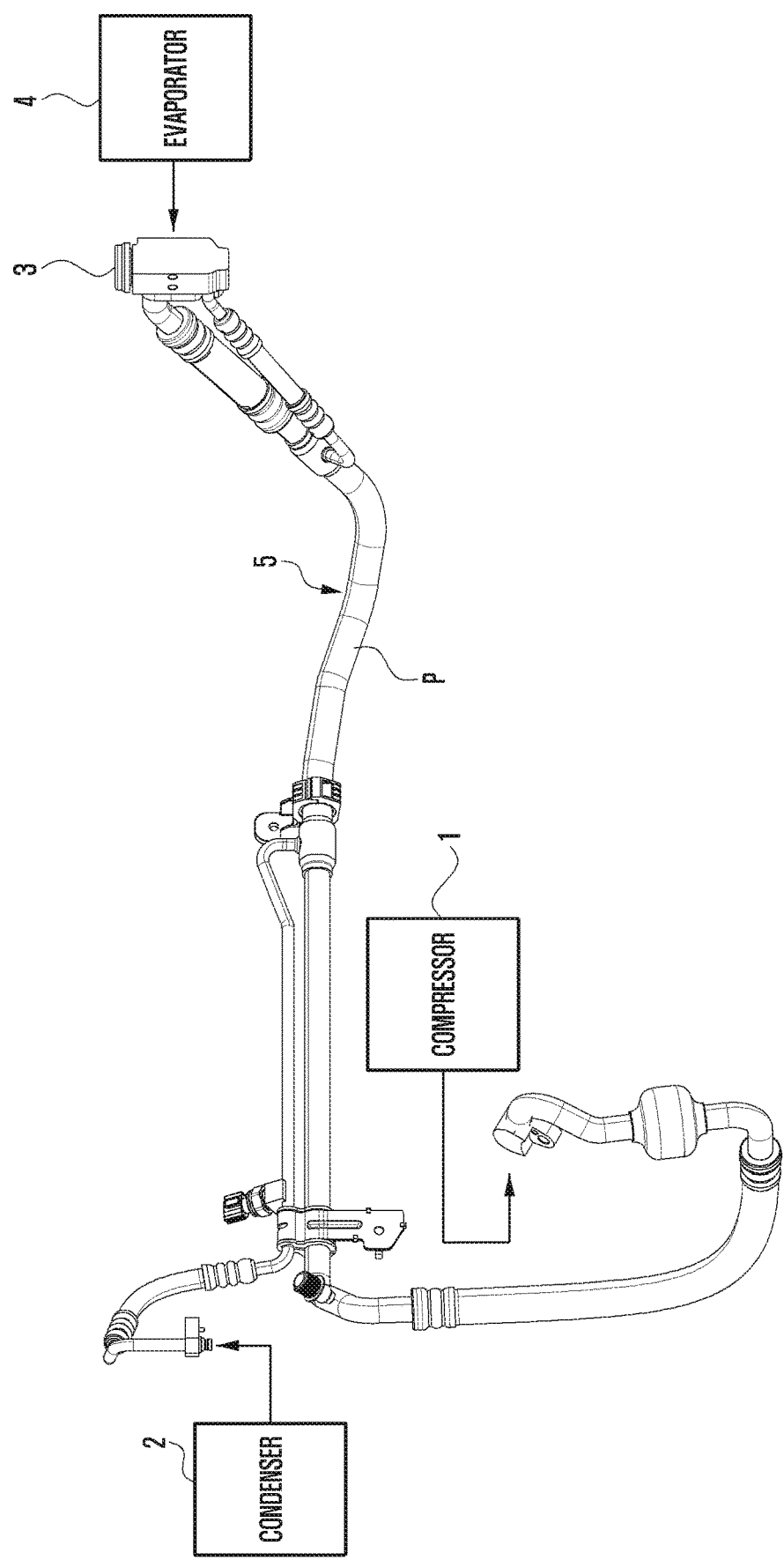
FIG. 2 is a schematic view illustrating a vehicle air conditioning system including a conventional double tube heat exchanger.

Now, embodiments of the disclosure will be described in detail with reference to the accompanying drawings. In the following, descriptions of techniques that are well known in the art and not directly related to the disclosure are omitted. This is to clearly convey the subject matter of the disclosure by omitting any unnecessary explanation. In the drawings, the same or corresponding elements are denoted by the same reference numerals.

Hereinafter, a plate-type heat exchanger according to an embodiment of the disclosure and a vehicle air conditioning system including the same will be described with reference to FIGS. 3 to 10.

Figure 3:
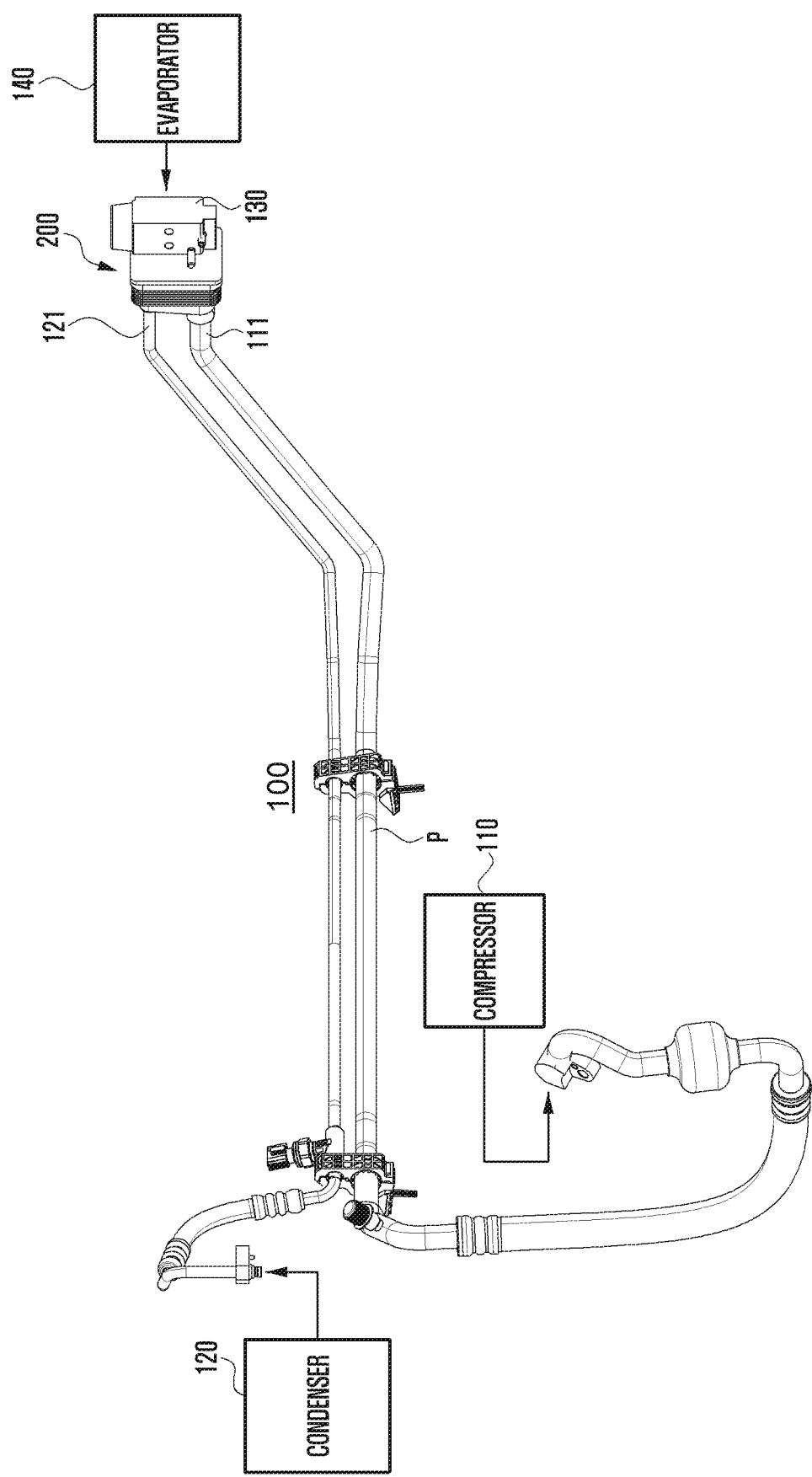
FIG. 3 is a schematic view illustrating a vehicle air conditioning system including a plate-type heat exchanger according to an embodiment of the disclosure.

FIG. 3 is a schematic view illustrating a vehicle air conditioning system including a plate-type heat exchanger according to an embodiment of the disclosure.

Referring to FIG. 3, the vehicle air conditioning system 100 may include a. compressor 110, a condenser 120, an expansion valve 130, an evaporator 140, and a plate-type heat exchanger 200. The compressor 110 compresses a refrigerant. The condenser 120 condenses the refrigerant supplied from the compressor 110. The expansion valve 130 expands the refrigerant by adjusting a flow rate of the refrigerant supplied from the condenser 120. The evaporator 140 evaporates the refrigerant supplied from the expansion valve 130 by exchanging heat with a blown air to cool the air. The plate-type heat exchanger 200 performs a heat exchange between the refrigerant flowing into the expansion valve 130 from the condenser 120 and the refrigerant discharged from the evaporator 140. The plate-type heat exchanger 200 may be bonded to and formed integrally with the expansion valve 130.

Figure 4:
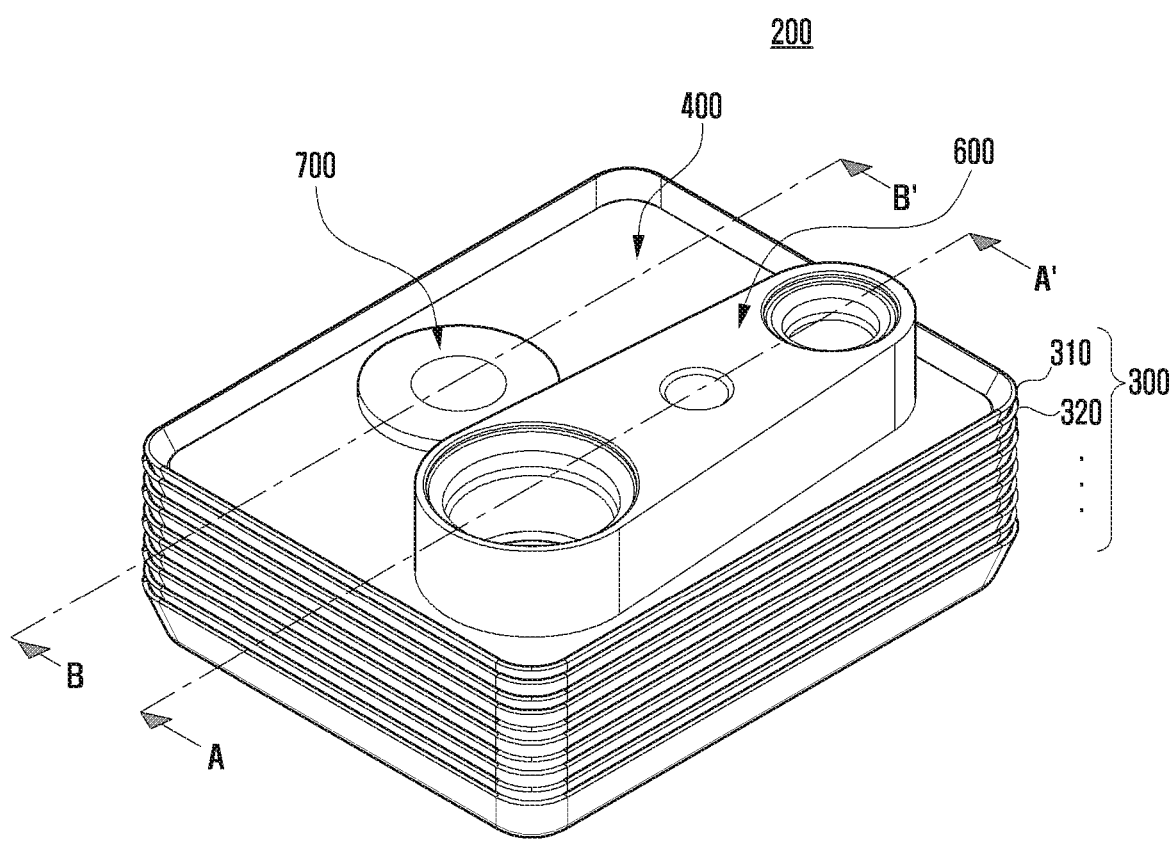
FIG. 4 is a perspective view illustrating a structure of a plate-type heat exchanger according to an embodiment of the disclosure.
Figure 5:
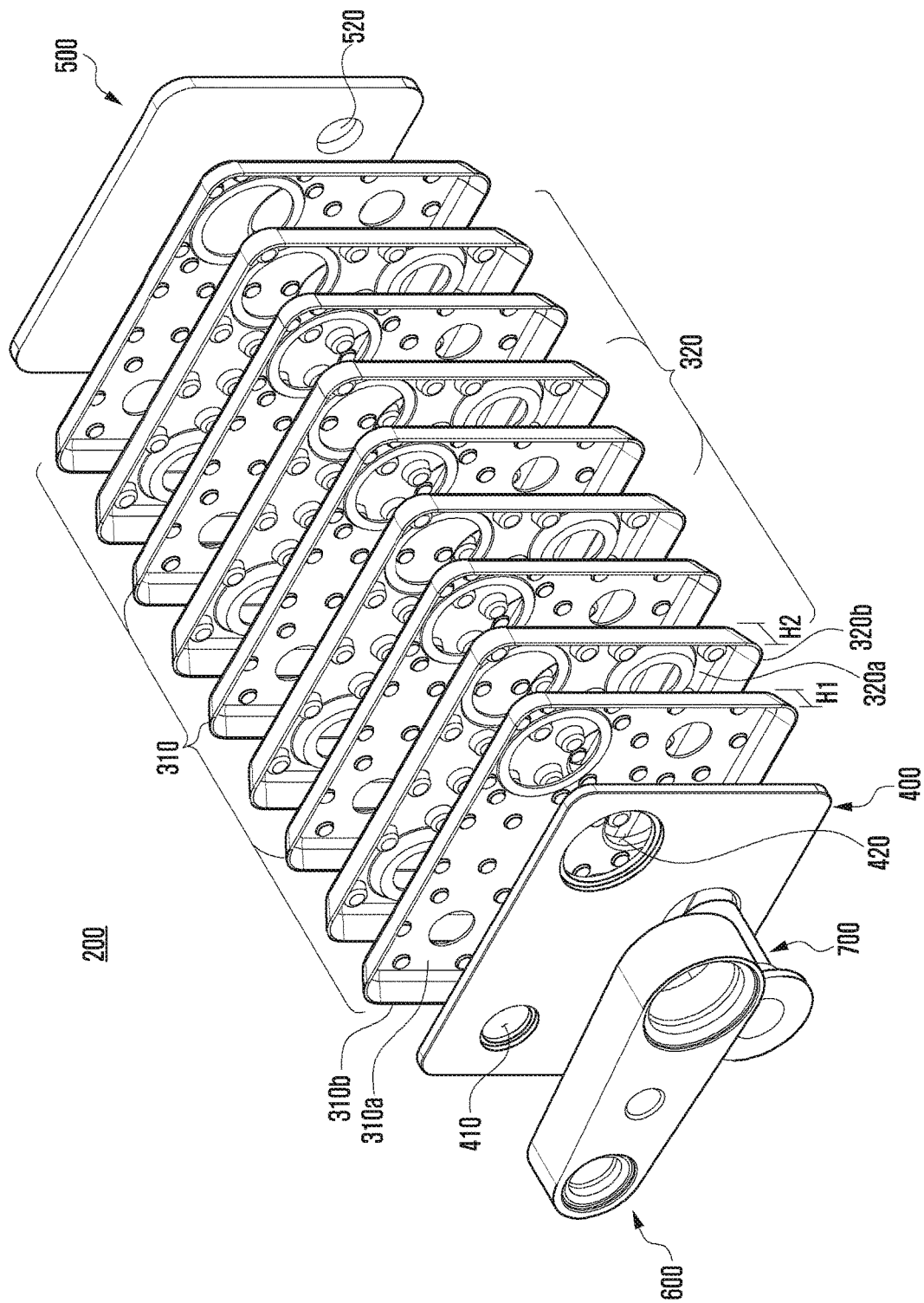
FIG. 5 is an exploded perspective view of FIG. 4.
Figure 6:
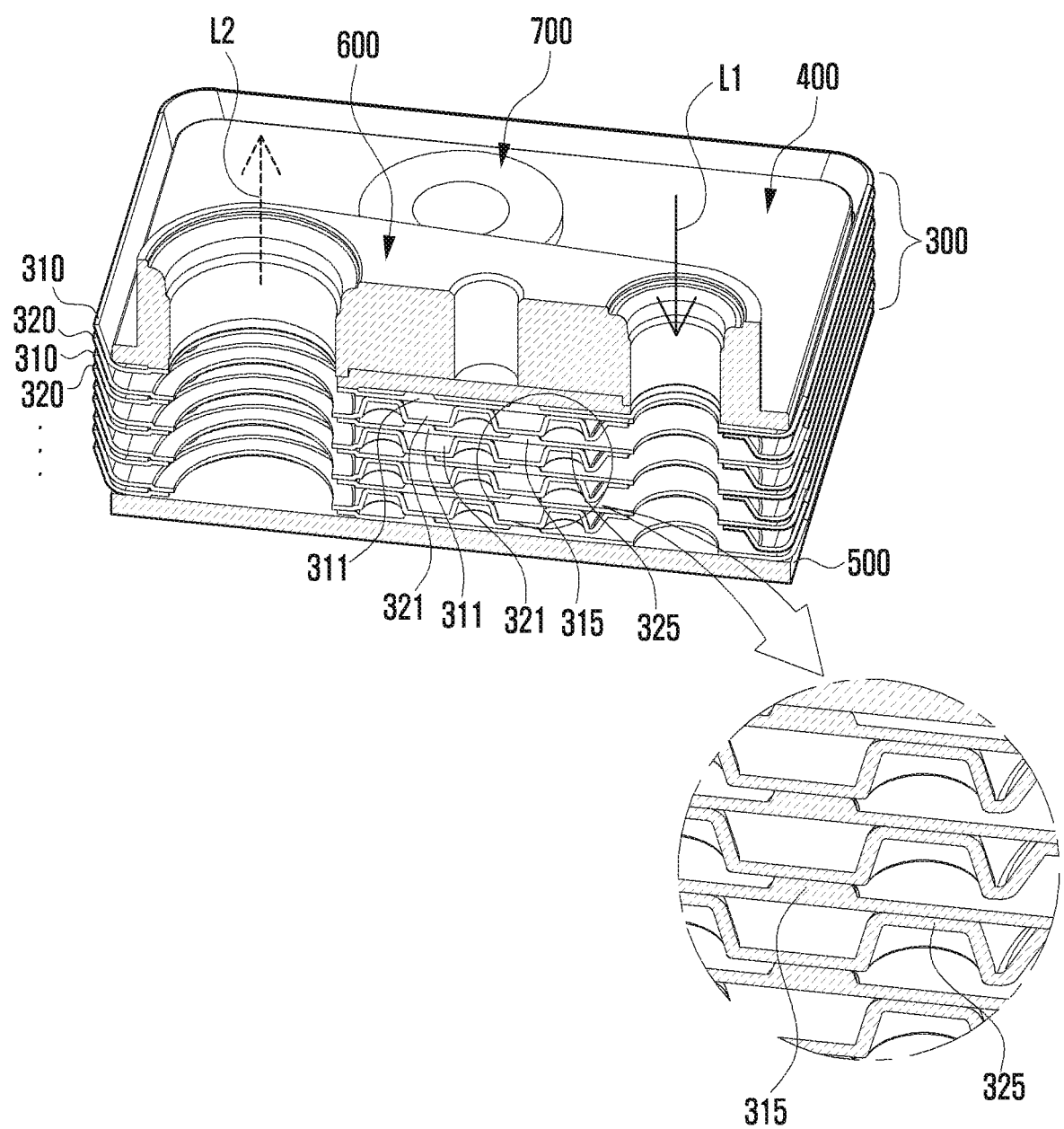
FIG. 6 is a perspective view illustrating a cross section taken along line A-A of FIG. 4.
Figure 7:
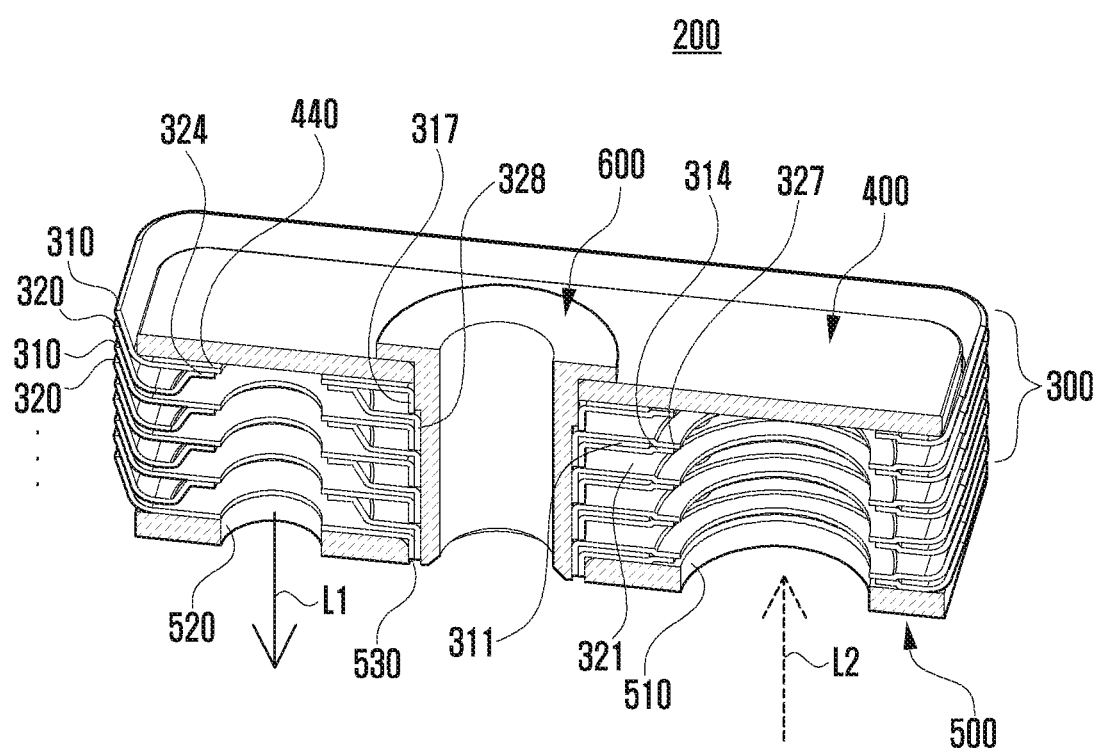
FIG. 7 is a perspective view illustrating a cross section taken along line B-B of FIG. 4.

FIG. 4 is a perspective view illustrating a structure of the plate-type heat exchanger 200 according to an embodiment of the disclosure, and FIG. 5 is an exploded perspective view of the plate-type heat exchanger 200 of FIG. 4. FIG. 6 is a perspective view illustrating a cross section taken along line A-A of FIG. 4, and FIG. 7 is a perspective view illustrating a cross section taken along line B-B of FIG. 4. In FIGS. 6 and 7, solid arrows indicate inflow and discharge directions of a first refrigerant in the plate-type heat exchanger, and dotted arrows indicate inflow and discharge directions of a second refrigerant in the plate-type heat exchanger.

Referring to FIGS. 4 to 7, the plate-type heat exchanger 200 may include a body plate 300, an upper plate 400, and a lower plate 500.

The body plate 300 is capable of performing a heat exchange between a first refrigerant L1, which is a high-temperature high-pressure liquid refrigerant that flows from the condenser 120 to the evaporator 140, and a second refrigerant L2, which is a low-temperature low-pressure gaseous refrigerant that flows from the evaporator 140 to the compressor 110. The body plate 300 may include a plurality of high-temperature high-pressure plates 310 and a plurality of low-temperature low-pressure plates 320, which are alternately stacked and bonded to each other.

The plurality of high-temperature high-pressure plates 310 form a first heat exchange passage 311 through which the first refrigerant L1 flows. Similarly, the low-temperature low-pressure plates 320 form a second heat exchange passage 321 through which the second refrigerant L2 flows.

Figure 8A:
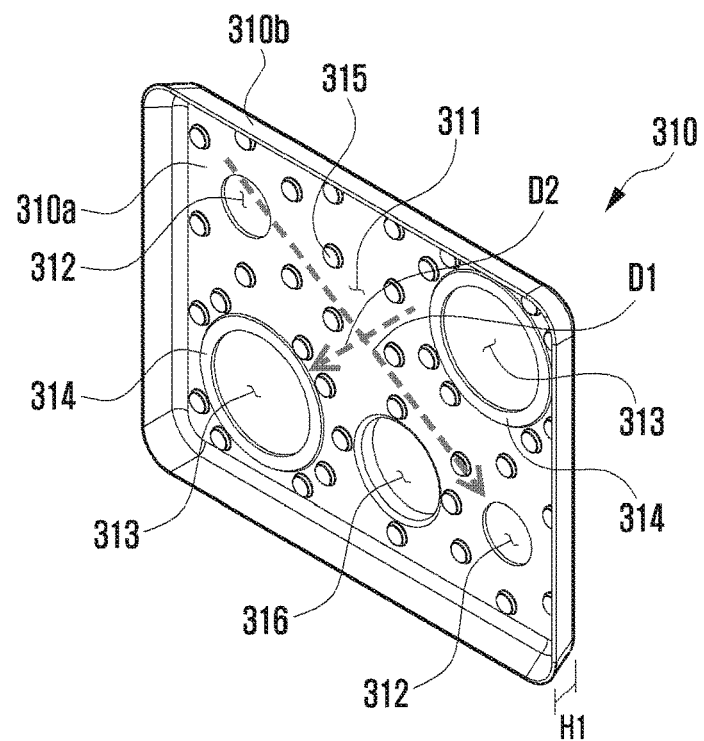
FIGS. 8A and 8B are perspective views illustrating front and rear structures of a high-temperature high-pressure plate according to an embodiment of the disclosure.
Figure 8B:
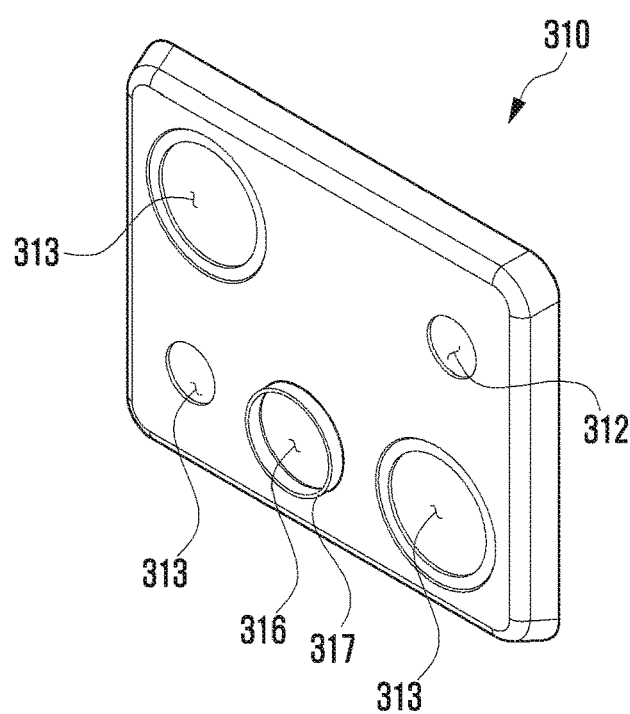
Figure 9A:
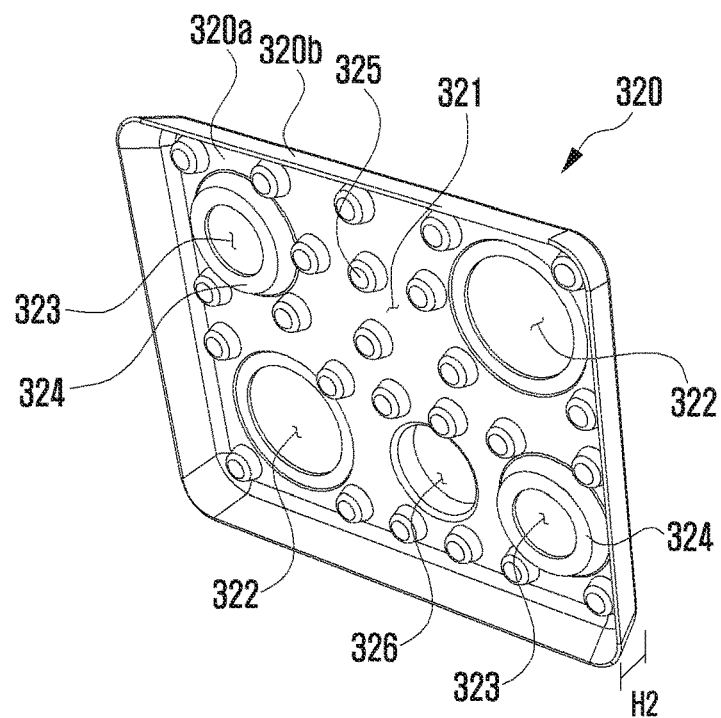
FIGS. 9A and 9B are perspective views illustrating front and rear structures of a low-temperature low-pressure plate according to an embodiment of the disclosure.
Figure 9B:
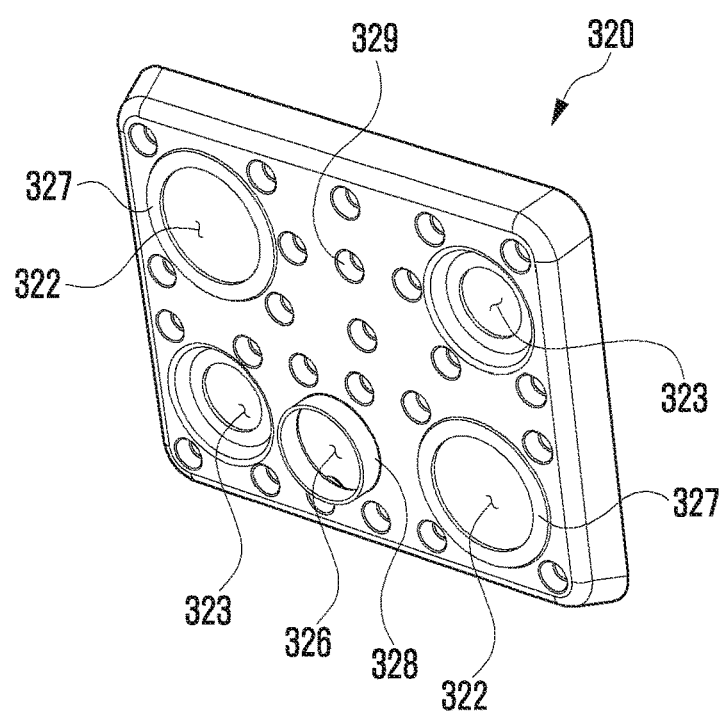

FIGS. 8A and 8B are perspective views illustrating front and rear structures of a high-temperature high-pressure plate according to an embodiment of the disclosure, and FIGS. 9A and 9B are perspective views illustrating front and rear structures of a low-temperature low-pressure plate according to an embodiment of the disclosure.

Figure 10A:
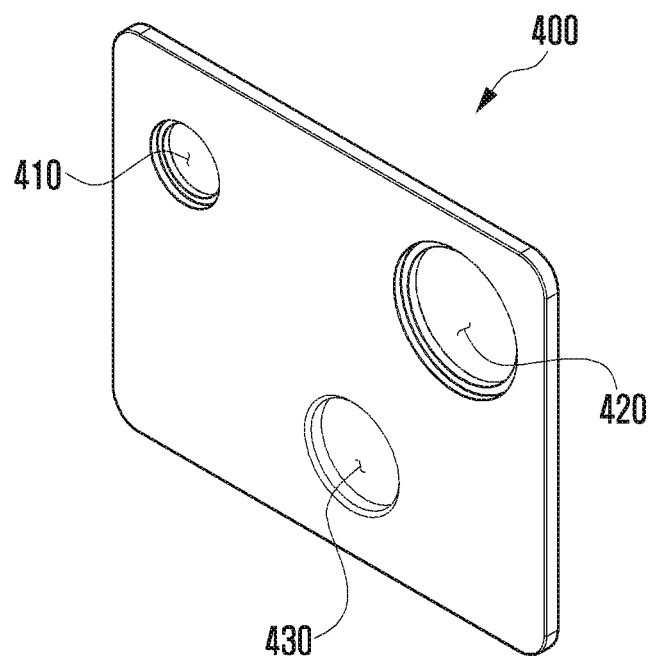
FIGS. 10A and 10B are perspective views illustrating front and rear structures of an upper plate according to an embodiment of the disclosure.
Figure 10B:
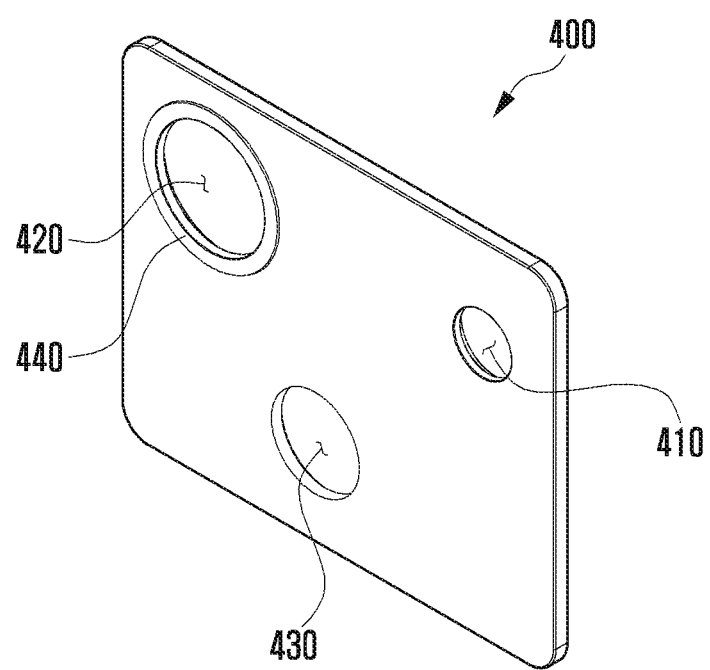

In addition, FIGS. 10A and 10B are perspective views illustrating front and rear structures of an upper plate according to an embodiment of the disclosure.

Hereinafter, the structure of each plate will be described in detail with reference to FIGS. 8A to 10B. In the following description, as shown in FIG. 8A, a direction from an upper left corner to a lower right corner of a plate will be defined as a first diagonal direction D1, and a direction from an upper right corner to a lower left corner of the plate will be defined as a second diagonal direction D2.

As shown in FIGS. 8A and 8B, each of the plurality of high-temperature high-pressure plates 310 may include a first plate 310a and a first edge wall 310b. The first plate 310a is formed in a plate shape, and the first edge wall 310b protrudes in the front direction along the edge of the first plate 310a while being inclined outward at a certain angle.

The first heat exchange passage 311 described above is formed by the high-temperature high-pressure plate 310. The first heat exchange passage 311 allows the first refrigerant L1 to flow in the diagonal directions D1 and D2. The high-temperature high-pressure plate 310 has a pair of first refrigerant connection holes 312, which may be formed near both corners of the high-temperature high-pressure plate 310 in the first diagonal direction D1. The first refrigerant connection hole 312 connects the first heat exchange passages 311 of the plurality of high-temperature high-pressure plates 310.

Among the plurality of high-temperature high-pressure plates 310, the foremost plate disposed at the foremost (i.e., being connected to the condenser 120) may be connected to a first inlet hole 410 of the upper plate 400, as shown in FIG. 5, to allow the first refrigerant L1 discharged through an outlet pipe 121 of the condenser 120 to flow in the first heat exchange passage 311. In addition, among the plurality of high-temperature high-pressure plates 310, the rearmost plate disposed at the rearmost (i.e., being connected to the expansion valve 130) may be connected to a second outlet hole 520 of the lower plate 500, as shown in FIG. 5, to allow the first refrigerant L1 flowing through the first heat exchange passage 311 to flow in an inlet pipe (not shown) of the expansion valve 130.

In addition, the high-temperature high-pressure plate 310 may have a pair of second refrigerant transit holes 313, which may be formed near both corners of the high-temperature high-pressure plate 310 in the second diagonal direction D2. The second refrigerant transit hole 313 allows the second refrigerant L2 flowing between the low-temperature low-pressure plates 320 to pass through the high-temperature high-pressure plate 310.

In addition, the high-temperature high-pressure plate 310 may include first column members 314, each of which has a hollow, protrudes from the front surface of the high-temperature high-pressure plate 310, and is formed along the rim of the second refrigerant transit hole 313.

The first column members 314 are bonded by brazing to third column members 327 formed on the rear surface of the low-temperature low-pressure plate 320 or fourth column members 440 formed on the rear surface of the upper plate 400. This not only maintains a gap between the high-temperature high-pressure plate 310 and the low-temperature low-pressure plate 320 or between the high-temperature high-pressure plate 310 and the upper plate 400, but also prevents the second refrigerant L2 passing through the second refrigerant transit hole 313 from flowing into the first heat exchange passage 311 of the high-temperature high-pressure plate 310.

Meanwhile, as mentioned above, the plurality of low-temperature low-pressure plates 320 are alternately stacked with the plurality of high-temperature high-pressure plates 310. In this structure, a heat exchange is performed between the first refrigerant L1 flowing through the first heat exchange passage 311 of the high-temperature high-pressure plate 310 and the second refrigerant L2 flowing through the second heat exchange passage 321 of the low-temperature low-pressure plate 320.

As shown in FIGS. 9A and 9B, each of the plurality of low-temperature low-pressure plates 320 may include a second plate 320a and a second edge wall 320b. The second plate 320a is formed in a plate shape, and the second edge wall 320b protrudes in the front direction along the edge of the second plate 320a while being inclined outward at a certain angle. The height H2 of the second edge wall 320b may be formed to be greater than the height H1 of the first edge wall 310b.

Forming the height H2 of the second edge wall 320b greater than the height H1 of the first edge wall 310b is not only to increase the volume of the low-temperature low-pressure plate 320 than the volume of the high-temperature high-pressure plate 310, but also to reduce the entire volume of the plate-type heat exchanger 200 according to the disclosure as much as possible compared to a typical plate-type heat exchanger in which the volume of each plate is formed equally. In other words, because the volume of the first refrigerant L1, which is a liquid refrigerant, is smaller than the volume of the second refrigerant L2, which is a gaseous refrigerant, it is desirable to form the low-temperature low-pressure plate 320 to have a larger volume than the high-temperature high-pressure plate 310. This may secure a desired flow rate of the second refrigerant L2 and increase a flow speed and pressure of the first refrigerant L1. Therefore, it is possible to reduce the entire volume of the plate-type heat exchanger 200 as much as possible while improving heat exchange performance between the first refrigerant and the second refrigerant.

The second heat exchange passage 321 described above is formed by the low-temperature low-pressure plate 320. The second heat exchange passage 321 allows the second refrigerant L2 to flow in the diagonal directions D1 and D2. The low-temperature low-pressure plate 320 has a pair of second refrigerant connection holes 322, which may be formed near both corners of the low-temperature low-pressure plate 320 in the second diagonal direction D2 crossing the first diagonal direction D1. The second refrigerant connection hole 322 connects the second heat exchange passages 321 of the plurality of low-temperature low-pressure plates 320.

In addition, the low-temperature low-pressure plate 320 may have a pair of first refrigerant transit holes 323, which may be formed near both corners of the low-temperature low-pressure plate 330 in the first diagonal direction D1. The first refrigerant transit hole 323 allows the first refrigerant L1 flowing between the high-temperature high-pressure plates 310 to pass through the low-temperature low-pressure plate 320.

In addition, the low-temperature low-pressure plate 320 may include second column members 324, each of which has a hollow, protrudes from the front surface of the low-temperature low-pressure plate 320, and is formed along the rim of the first refrigerant transit hole 323. It is desirable that the height of the second column member 324 is formed greater than the height of the first column member 314.

The second column members 324 are bonded to the rear surface of the high-temperature high-pressure plate 310, thereby not only maintaining a gap between the high-temperature high-pressure plate 310 and the low-temperature low-pressure plate 320, but also preventing the first refrigerant L1 passing through the first refrigerant transit hole 323 from flowing into the second heat exchange passage 321 of the low-temperature low-pressure plate 320.

In addition, the low-temperature low-pressure plate 320 may include third column members 327, each of which has a hollow, protrudes from the rear surface of the low-temperature low-pressure plate 320, and is formed along the rim of the second refrigerant connection hole 322. The third column members 327 are bonded by brazing to the first column members 314 of the high-temperature high-pressure plate 310, thereby maintaining a gap between the high-temperature high-pressure plate 310 and the low-temperature low-pressure plate 320.

Referring again to FIGS. 6, 8 to 10, the high-temperature high-pressure plate 310 may further include a plurality of first support protrusions 315, which are arranged on and protrude from the front surface of the first plate 310a and support the rear surface of the low-temperature low-pressure plate 320 or the rear surface of the upper plate 400.

In this case, the plurality of first support protrusions 315 formed on the foremost high-temperature high-pressure plate 310 support the rear surface of the upper plate 400, and the plurality of first support protrusions 315 formed on each of the remaining high-temperature high-pressure plates 310 support the rear surface of the corresponding low-temperature low-pressure plate 320.

Similarly, the low-temperature low-pressure plate 320 may further include a plurality of second support protrusions 325, which are arranged on and protrude from the front surface of the second plate 310a and support the rear surface of the high-temperature high-pressure plate 310. It is desirable that the height of the second support protrusion 325 is formed greater than the height of the first support protrusion 315.

A brazing process of bonding the upper plate 400, the high-temperature high-pressure plates 310, the low-temperature low-pressure plates 320, and the lower plate 500 is performed in a state where a separate pressing device (not shown) applies pressure to a relatively upper plate to increase a bonding force between the respective plates. However, when the pressure of the pressing device is transmitted to each plate, deformation of each plate may occur. Thus, the first and second support protrusions 315 and 325 are provided between the respective plates so that each plate can withstand the pressure of the pressing device.

In addition, the-low temperature low-pressure plate 320 may further have a plurality of concave portions 329, which are formed at positions corresponding to the second support protrusion 325 on the rear surface of the-low temperature low-pressure plate 320. That is, when pressing a plurality of portions on the rear surface of the low-temperature low-pressure plate 320 to form the second support protrusions 325, the second support protrusions 325 are formed on the front surface of the low-temperature low-pressure plate 320, and simultaneously the concave portions 329 are formed on the rear surface. In this case, it is desirable that the first support protrusion 315 and the second support protrusion 325 are disposed not to overlap each other and, thus, the first support protrusion 315 is prevented from being positioned inside the concave portion 329 formed on an opposite location of the second support protrusion 325.

Forming the plurality of concave portions 329 on the rear surface of the low-temperature low-pressure plate 320 may ensure a sufficient flow rate of the first refrigerant L1 flowing through the first heat exchange passage 311 even though the volume and height of the high-temperature high-pressure plate 310 are not increased.

As described above, when brazing bond is completed in a state where the high-temperature high-pressure plates 310 and the low-temperature low-pressure plates 320 are alternately stacked with each other, the body plate 300 in which a heat exchange between the first refrigerant L1 and the second refrigerant L2 is performed is obtained.

As shown in FIGS. 10A and 10B, the upper plate 400 bonded to the body plate 300 may have a first inlet hole 410 and a first outlet hole 420. The first inlet hole 410 connects the first heat exchange passage 311 and the outlet pipe 121 of the condenser 120, and the first outlet hole 420 connects the second heat exchange passage 321 and the inlet pipe 111 of the compressor 110.

On the rear surface of the upper plate 400, a fourth column member 440 may be formed along the rim of the first outlet hole 420. The fourth column member 440 is bonded by brazing to the first column member 314 to maintain a gap between the upper plate 400 and the high-temperature high-pressure plate 310.

Referring again to FIGS. 4 to 7, the lower plate 500 is bonded at one side to the body plate 300 and also connected at the other side to the expansion valve 130. The lower plate 500 may have a second inlet hole 510 connected to the outlet pipe (not shown) of the expansion valve 130, and a second outlet hole 520 connected to the inlet pipe (not shown) of the expansion valve 130.

According to an embodiment, the plate-type heat exchanger 200 may further include a flange 600 that connects the first inlet hole 410 of the upper plate 400 to the outlet pipe 121 of the condenser 120 and also connects the first outlet hole 420 of the upper plate 400 to the inlet pipe 111 of the compressor 110.

In this case, the flange 600 may be mounted on and combined with the upper plate 400 to communicate with the first inlet hole 410 and the first outlet hole 420.

The flange 600 not only allows the outlet pipe 121 of the condenser 120 to be easily connected to the first inlet hole 410 of the upper plate 400, but also allows the inlet pipe 111 of the compressor 110 to be easily connected to the first outlet hole 420 of the upper plate 400.

According to an embodiment, the plate-type heat exchanger 200 may further include a coupling member 700 that integrally couples the upper plate 400, the body plate 300 composed of the high-temperature high-pressure plates 310 and the low-temperature low-pressure plates 320, and the lower plate 500.

In this case, a first through-hole 430 is formed in the upper plate 400, a second through-hole 316 is formed in the high-temperature high-pressure plates 310, a third through-hole 326 is formed in the low-temperature low-pressure plates 320, and a fourth through-hole 530 is formed in the lower plate 500. The coupling member 700 is inserted into and brazing-bonded to the first to fourth through-holes 430, 316, 326, and 530.

Along the rims of the second and third through-holes 316 and 326, a first bonding portion 317 and a second bonding portion 328 may be formed respectively to protrude in the insertion direction of the coupling member 700. In this case, it is desirable that the height of the first bonding portion 317 is smaller than the height of the second bonding portion 328 in consideration of a gap between the high-temperature high-pressure plate 310 and the low-temperature low-pressure plate 320.

Meanwhile, in a state where one end of the first bonding portion 317 is in contact with the third through-hole 326 and one end of the second bonding portion 328 is in contact with the second through-hole 316, the coupling member 700 may be bonded to all of the first through-hole 430, the first bonding portion 317, the second bonding portion 328, and the fourth through-hole 530 through a brazing bonding process.

According to the disclosure, because a heat exchanger for exchanging heat between the first refrigerant flowing from the condenser to the expansion valve and the second refrigerant discharged from the evaporator is constructed as the plate-type heat exchanger, sufficient heat exchange performance can be accomplished and the layout of the engine room is easy.

In addition, according to the disclosure, the size and volume of the plate-type heat exchanger can be reduced as much as possible by forming different heights of the low-temperature low-pressure plate through which the low-temperature low-pressure gaseous refrigerant flows and the high-temperature high-pressure plate through which the high-temperature high-pressure liquid refrigerant flows.

In addition, according to the disclosure, by forming the first support protrusions and the second support protrusions on the high-temperature high-pressure plate and the low-temperature low-pressure plate, deformation of each plate may be prevented during the brazing bonding process.

While the disclosure has been particularly shown and described with reference to exemplary embodiments thereof, it will be understood by those skilled in the art that various changes in form and details may be made therein without departing from the scope of the subject matter as defined by the appended claims.

What is claimed is:

1. A plate-type heat exchanger comprising:
a body plate comprising a plurality of alternately stacked plates, a space between the plurality of plates having a first heat exchange passage through which a first refrigerant of high temperature and high pressure flows, and a second heat exchange passage through which a second refrigerant of low temperature and low pressure flows, wherein a heat exchange between the first refrigerant and the second refrigerant is performed in the body plate;
an upper plate bonded to a front side of the body plate and having a first inlet hole through which the first refrigerant is introduced and a first outlet hole through which the second refrigerant is discharged; and
a lower plate bonded to a rear side of the body plate and having a second inlet hole through which the second refrigerant is introduced and a second outlet hole through which the first refrigerant is discharged,
wherein the body plate further comprises:
a plurality of high-temperature high-pressure plates each comprising:
a first plate of a plate shape;
a first edge wall protruding in a front direction along an edge of the first plate while being inclined outward at a certain first angle; and
a plurality of first support protrusions protruding from a front surface of the first plate, wherein the first heat exchange passage is formed by the plurality of high-temperature high-pressure plates; and
a plurality of low-temperature low-pressure plates alternately stacked with the plurality of high-temperature high-pressure plates, each of the plurality of low-temperature low-pressure plates comprising:
a second plate of a plate shape;
a second edge wall protruding in a front direction along an edge of the second plate while being inclined outward at a certain second angle;
a plurality of second support protrusions protruding from a front surface of the second plate, wherein the second heat exchange passage is formed by the plurality of low-temperature low-pressure plates, and wherein the second edge wall is greater in height than the first edge wall; and
a plurality of concave portions formed at positions corresponding to positions of the plurality of second support protrusions on a rear surface of the low-temperature low-pressure plate so as to ensure a flow rate of the first refrigerant flowing through the first heat exchange passage, and
wherein each of the plurality of first support protrusions and each of the plurality of second support protrusions are disposed not to overlap each other so as to prevent each of the plurality of first support protrusions from being positioned inside the concave portion formed on an opposite location of a corresponding one of the plurality of second support protrusions;
wherein each of the plurality of first support protrusions is formed lower than a height of a corresponding one of the plurality of second support protrusions and supports the upper plate and the low-temperature low-pressure plate so as to maintain a gap;
wherein each of the plurality of second support protrusions supports the high-temperature high-pressure plate so as to maintain a gap.

2. The plate-type heat exchanger of claim 1, wherein each of the plurality of high-temperature high-pressure plates further comprises:
a pair of first refrigerant connection holes formed near first and second corners of the high-temperature high-pressure plate in a first diagonal direction on a front surface of the high-temperature high-pressure plate and connecting the first heat exchange passages of the plurality of high-temperature high-pressure plates;
a pair of second refrigerant transit holes formed near third and fourth corners of the high-temperature high-pressure plate in a second diagonal direction crossing the first diagonal direction and allowing the second refrigerant flowing between the low-temperature low-pressure plates to pass through the high-temperature high-pressure plate; and
first column members, each of which has a hollow, protrudes from the front surface of the high-temperature high-pressure plate, is formed along a rim of the second refrigerant transit hole, and is bonded to a rear surface of the low-temperature low-pressure plate or a rear surface of the upper plate so as to maintain a gap between the high-temperature high- pressure plate and the low-temperature low-pressure plate or between the high-temperature high-pressure plate and the upper plate and also prevent the second refrigerant passing-through the second refrigerant transit hole from flowing into the first heat exchange passage of the high-temperature high-pressure plate.

3. The plate-type heat exchanger of claim 2, wherein each of the plurality of low-temperature low-pressure plates further comprises:
a pair of second refrigerant connection holes formed near first and second corners of the low-temperature low-pressure plate in the second diagonal direction on a front surface of the low-temperature low-pressure plate and connecting the second heat exchange passages of the plurality of low-temperature low-pressure plates;
a pair of first refrigerant transit holes formed near third and fourth corners of the low-temperature low-pressure plate in the first diagonal direction and allowing the first refrigerant flowing between the high-temperature high-pressure plates to pass through the low-temperature low-pressure plate; and
second column members, each of which has a hollow, protrudes from the front surface of the low-temperature low-pressure plate, is formed along a rim of the first refrigerant transit hole, and is bonded to a rear surface of the high-temperature high-pressure plate so as to maintain the gap between the high-temperature high-pressure plate and the low-temperature low-pressure plate and also prevent the first refrigerant passing through the first refrigerant transit hole from flowing into the second heat exchange passage of the low-temperature low-pressure plate, wherein the second column member is greater in height than the first column member.

4. The plate-type heat exchanger of claim 1, wherein the first inlet hole connects one end of the first heat exchange passage to an outlet pipe of a condenser, the first outlet hole connects one end of the second heat exchange passage to an inlet pipe of a compressor, the second inlet hole connects other end of the second heat exchange passage to an outlet pipe of an expansion valve, and the second outlet hole connects other end of the first heat exchange passage to an inlet pipe of the expansion valve.

5. The plate-type heat exchanger of claim 4, further comprising:
a flange mounted on and combined with the upper plate to communicate with the first inlet hole and the first outlet hole, connecting the first inlet hole to the outlet pipe of the condenser, and connecting the first outlet hole to the inlet pipe of the compressor.

6. The plate-type heat exchanger of claim 1, further comprising:
a coupling member that integrally couples the upper plate, the high-temperature high-pressure plates, the low-temperature low-pressure plates, and the lower plate,
wherein a first through-hole is formed in the upper plate, a second through-hole is formed in the high-temperature high-pressure plates, a third through-hole is formed in the low-temperature low-pressure plates, and a fourth through-hole is formed in the lower plate, and wherein the coupling member is inserted into and brazing-bonded to the first to fourth through-holes.

7. The plate-type heat exchanger of claim 6, wherein along rims of the second and third through-holes, a first bonding portion and a second bonding portion are formed respectively to protrude in an insertion direction of the coupling member, the first bonding portion being smaller in height than the second bonding portion, and
wherein in a state where one end of the first bonding portion is in contact with the third through-hole and one end of the second bonding portion is in contact with the second through-hole, the coupling member is bonded to all of the first through-hole, the first bondingportion, the second bonding portion, and the fourth through-hole.

8. A vehicle air conditioning system comprising:
a compressor compressing a refrigerant;
a condenser condensing the refrigerant supplied from the compressor;
an expansion valve expanding the refrigerant by adjusting a flow rate of the refrigerant supplied from the condenser;
an evaporator evaporating the refrigerant supplied from the expansion valve by exchanging heat with a blown air to cool the air; and
a plate-type heat exchanger performing a heat exchange between a first refrigerant of high-temperature and high-pressure flowing into the expansion valve from the condenser anda second refrigerant of low-temperature and low-pressure discharged from the evaporator, the plate-type heat exchanger being bonded to and formed integrally with the expansion valve,
wherein the plate-type heat exchanger comprises:
a body plate comprising a plurality of alternately stacked plates, a space between the plurality of plates having a first heat exchange passage through which the first refrigerant of high-temperature and high-pressure flows, and a second heat exchange passage through which the second refrigerant of low-temperature and low-pressure flows, wherein a heat exchange between the first refrigerant and the second refrigerant is performed in the body plate;
an upper plate bonded to a front side of the body plate and having afirst inlet hole through which the first refrigerant is introduced and a first outlet hole through which the second refrigerant is discharged; and
a lower plate bonded to a rear side of the body plate and having a second inlet hole through which the second refrigerant is introduced and a second outlet hole through which the first refrigerant is discharged,
wherein the body plate further comprises:
a plurality of high-temperature high-pressure plates each comprising:
a first plate of a plate shape;
a first edge wall protruding in a front direction along an edge of the first plate while being inclined outward at a certain first angle; and
a plurality of first support protrusions protruding from a front surface of the first plate, whereinthe first heat exchange passage is formed by the plurality of high-temperature high-pressure plates; and
a plurality of low-temperature, low-pressure plates alternately stacked with the plurality of high-temperature high-pressure plates, each of the plurality of low-temperature low-pressure plates comprising:
a second plate of a plate shape;
a second edge wall protruding in a front direction along an edge of the second plate while being inclined outward at a certain second angle; and
a plurality of second support protrusions protrudingfrom a front surface of the second plate, wherein the second heat exchange passage is formed by the plurality of low-temperature low-pressure plates, and wherein the second edge wall is greater in height than the first edge wall; and
a plurality of concave portions formed at positions corresponding to positions of the plurality of second support protrusions on a rear surface of the low temperature low-pressure plate so as to ensure a flow rate of the first refrigerant flowing through the first heat exchange passage, and
wherein each of the plurality of first support protrusions and each of the plurality of second support protrusions are disposed not to overlap each other so as to prevent each of the plurality of first support protrusions from being positioned inside the concave portion formed on an opposite location of a corresponding one of the plurality of second support protrusions;
wherein each of the plurality of first support protrusions is formed lower than a height of a corresponding one of the plurality of second support protrusions and supports the upper plate and the low-temperature low-pressure plate so as to maintain a gap;
wherein each of the plurality of second support protrusions supports the high-temperature high-pressure plate so as to maintain a gap.

9. The vehicle air conditioning system of claim 8, wherein each of the plurality of high-temperature high-pressure plates further comprises:
a pair of first refrigerant connection holes formed near first and second corners of the high-temperature high-pressure plate in a first diagonal direction on a front surface of the high-temperature high-pressure plate and connecting the first heat exchange passages of the plurality of high-temperature high-pressure plates;
a pair of second refrigerant transit holes formed near third and fourth corners of the high-temperature high-pressure plate in a second diagonal direction crossing the first diagonal direction and allowing the second refrigerant flowing between the low-temperature low-pressure plates to pass through the high-temperature high-pressure plate; and first column members, each of which has a hollow, protrudes from the front surface of the high-temperature high-pressure plate, is formed along a rim of the second refrigerant transit hole, and is bonded to a rear surface of the low-temperature low-pressure plate or a rear surface of the upper plate so as to maintain a gap between the high-temperature high-pressure plate and the low-temperature low-pressure plate or between the high-temperature high-pressure plate and the upper plate and also prevent the second refrigerant passing-through the second refrigerant transit hole from flowing into the first heat exchange passage of the high-temperature high-pressure plate.

10. The vehicle air conditioning system of claim 9, wherein each of the plurality of low-temperature low-pressure plates further comprises:

a pair of second refrigerant connection holes formed near first and second corners of the low-temperature low-pressure plate in the second diagonal direction on a front surface of the low-temperature low-pressure plate and connecting the second heat exchange passages of the plurality of low-temperature low-pressure plates;

a pair of first refrigerant transit holes formed near third and fourth corners of the low-temperature low-pressure plate in the first diagonal direction and allowing the first refrigerant flowing between the high-temperature high-pressure plates to pass through the low-temperature low-pressure plate; and second column members, each of which has a hollow, protrudes from the front surface of the low-temperature low-pressure plate, is formed along a rim of the first refrigerant transit hole, and is bonded to a rear surface of the high-temperature high-pressure plate so as to maintain the gap between the high-temperature high-pressure plate and the low-temperature low-pressure plate and also prevent the first refrigerant passing through the first refrigerant transit hole from flowing into the second heat exchange passage of the low-temperature low-pressure plate, wherein the second column member is greater in height than the first column member.

11. The vehicle air conditioning system of claim 8, wherein the first inlet hole connects one end of the first heat exchange passage to an outlet pipe of a condenser, the first outlet hole connects one end of the second heat exchange passage to an inlet pipe of a compressor, the second inlet hole connects other end of the second heat exchange passage to an outlet pipe of an expansion valve, and the second outlet hole connects other end of the first heat exchange passage to an inlet pipe of the expansion valve.

12. The vehicle air conditioning system of claim 11, further comprising:

a flange mounted on and combined with the upper plate to communicate with the first inlet hole and the first outlet hole, connecting the first inlet hole to the outlet pipe of the condenser, and connecting the first outlet hole to the inlet pipe of the compressor.

13. The vehicle air conditioning system of claim 8, further comprising:

a coupling member that integrally couples the upper plate, the high-temperature high-pressure plates, the low-temperature low-pressure plates, and the lower plate, wherein a first through-hole is formed in the upper plate, a second through-hole is formed in the high-temperature high-pressure plates, a third through-hole is formed in the low-temperature low-pressure plates, and a fourth through-hole is formed in the lower plate, and wherein the coupling member is inserted into and brazing-bonded to the first to fourth through-holes.

14. The vehicle air conditioning system of claim 13, wherein along rims of the second and third through-holes, a first bonding portion and a second bonding portion are formed respectively to protrude in an insertion direction of the coupling member, the first bonding portion being smaller in height than the second bonding portion, and wherein in a state where one end of the first bonding portion is in contact with the third through-hole and one end of the second bonding portion is in contact with the second through-hole, the coupling member is bonded to all of the first through-hole, the first bonding portion, the second bonding portion, and the fourth through-hole.

* * * * *

UNITED STATES PATENT AND TRADEMARK OFFICE
CERTIFICATE OF CORRECTION

PATENT NO. : 11,364,773 B2
APPLICATION NO. : 17/065723
DATED : June 21, 2022
INVENTOR(S) : Jae Hyeok Choi et al.

It is certified that error appears in the above-identified patent and that said Letters Patent is hereby corrected as shown below:

In the Claims

Column 10, Claim 2, Line 21, delete "ofthe" and insert in its place --of the--.

Column 10, Claim 2, Line 24, delete "arear" and insert in its place --a rear--.

Column 10, Claim 2, Line 29, delete "passing-" and insert in its place --passing--.

Column 10, Claim 3, Line 49, delete "surfaceof" and insert in its place --surface of--.

Column 10, Claim 3, Line 51, delete "transithole," and insert in its place --transit hole,--.

Column 11, Claim 7, Line 33, delete "bondingportion," and insert in its place --bonding portion,--.

Column 11, Claim 8, Line 49, delete "anda" and insert in its place --and a--.

Column 11, Claim 8, Line 64, delete "afirst" and insert in its place --a first--.

Column 12, Claim 8, Line 13, delete "whereinthe" and insert in its place --wherein the--.

Column 12, Claim 8, Lines 26-27, delete "producingfrom" and insert in its place --protruding from--.

Column 13, Claim 9, Line 5, delete "ofthe" and insert in its place --of the--.

Column 13, Claim 9, Line 8, delete "arear" and insert in its place --a rear--.

Column 13, Claim 9, Line 13, delete "passing-" and insert in its place --passing--.

Column 13, Claim 10, Line 33, delete "surfaceof" and insert in its place --surface of--.

Signed and Sealed this
Twenty-sixth Day of July, 2022

Katherine Kelly Vidal
*Director of the United States Patent and Trademark Office*

CERTIFICATE OF CORRECTION (continued)
U.S. Pat. No. 11,364,773 B2

Column 13, Claim 10, Line 35, delete "transithole," and insert in its place --transit hole,--.

Column 14, Claim 14, Line 39, delete "bondingportion," and insert in its place --bonding portion,--.